US011372562B1

(12) United States Patent
Wu et al.

(10) Patent No.: US 11,372,562 B1
(45) Date of Patent: Jun. 28, 2022

(54) GROUP-BASED RAID-1 IMPLEMENTATION IN MULTI-RAID CONFIGURED STORAGE ARRAY

(71) Applicant: EMC IP HOLDING COMPANY LLC, Hopkinton, MA (US)

(72) Inventors: Peng Wu, Westborough, MA (US); Rong Yu, West Roxbury, MA (US); Jiahui Wang, Framingham, MA (US); Lixin Pang, Needham, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/225,170

(22) Filed: Apr. 8, 2021

(51) Int. Cl.
*G06F 3/06* (2006.01)

(52) U.S. Cl.
CPC .......... *G06F 3/0631* (2013.01); *G06F 3/0604* (2013.01); *G06F 3/0614* (2013.01); *G06F 3/0659* (2013.01); *G06F 3/0689* (2013.01)

(58) Field of Classification Search
CPC .... G06F 3/0604; G06F 3/0614; G06F 3/0631; G06F 3/0659; G06F 3/0689
See application file for complete search history.

(56) References Cited

U.S. PATENT DOCUMENTS

| 10,191,687 | B1 * | 1/2019 | Baruch | G06F 11/14 |
| 10,496,278 | B1 * | 12/2019 | O'Hare | G06F 3/0604 |
| 2019/0056882 | A1 * | 2/2019 | Feldman | G06F 3/0608 |
| 2021/0365379 | A1 * | 11/2021 | Creed | G06F 12/0897 |

* cited by examiner

*Primary Examiner* — Larry T Mackall
(74) *Attorney, Agent, or Firm* — Anderson Gorecki LLP

(57) ABSTRACT

A storage system that supports multiple RAID levels presents storage objects with front-end tracks corresponding to back-end tracks on non-volatile drives and accesses the drives using a single type of back-end allocation unit that is larger than a back-end track. When the number of members of a protection group of a RAID level does not align with the back-end allocation unit, multiple back-end tracks are grouped and accessed using a single IO. The number of back-end tracks in a group is selected to align with the back-end allocation unit size. If the front-end tracks are variable size, then front-end tracks may be destaged into a smaller number of grouped back-end tracks in a single IO.

20 Claims, 5 Drawing Sheets

GROUP-BASED RAID-1 IMPLEMENTATION IN MULTI-RAID CONFIGURED STORAGE ARRAY

TECHNICAL FIELD

The subject matter of this disclosure is generally related to electronic data storage systems, and more particularly to data storage systems that support multiple RAID levels.

BACKGROUND

High-capacity data storage systems such as storage area networks (SANs) and storage arrays are used to maintain large storage objects and contemporaneously support multiple host servers. A storage array includes a network of specialized interconnected compute nodes that manage access to data stored on arrays of drives. The compute nodes respond to input-output (IO) commands from host applications running on the host servers. Examples of host applications may include, but are not limited to, software for email, accounting, manufacturing, inventory control, and a wide variety of other business processes.

Storage arrays may be characterized by a block-based architecture. IOs from hosts reference logical block addresses (LBAs) of data allocation units known as front-end tracks (FE TRKs) of a logical volume of storage that the compute nodes present to the host servers. The compute nodes lack metadata that describes high-level data structures such as files in the host application data but maintain metadata that maps between the FE TRKs and physical addresses of corresponding back-end tracks (BE TRKs) on the managed drives. BE TRKs and FE TRKs should not be confused with the hard disk drive (HDD) "tracks" that characterize spinning disk storage architecture. An HDD track corresponds to a concentric band on a platter. A sector, which is the smallest unit of storage that an HDD can process, is a portion of one of those concentric bands, e.g., 1 track may have 32 sectors. BE TRKs are usually larger in size than HDD tracks and are not limited by the physical architecture of a spinning platter.

It is common practice to configure a storage array to use a single, fixed-size back-end allocation unit for IOs between the compute nodes and the managed drives so that metadata is practical and efficient for the compute nodes to manage. Some storage arrays use the BE TRK size as the back-end allocation unit size. In such a configuration, each write IO from a compute node and a managed drive locks one BE TRK, and each IO results in copying or destaging only one BE TRK between the compute node cache and the managed drives. However, it can be more efficient to access the managed drives using a back-end allocation unit that is larger than one BE TRK, e.g., a back-end allocation unit that is an integer (>1) multiple of the BE TRK size. One problem with implementation of a back-end allocation that is an integer (>1) multiple of the BE TRK size is that inefficiencies may be introduced when multiple RAID levels are supported because the back-end allocation size may misalign with the number of BE TRKs per IO needed for certain RAID levels.

SUMMARY

All examples, aspects and features mentioned in this document can be combined in any technically possible way.

In accordance with some implementations a method is implemented in a data storage system with a plurality of non-volatile drives and a plurality of interconnected compute nodes that access the drives using only one size of back-end allocation unit, the method comprising: the compute nodes presenting first and second logical production volumes to hosts, wherein front-end tracks of the first and second production volumes correspond to back-end tracks of the non-volatile drives, and the backend allocation unit has a size that is an integer multiple of the back-end track size that is greater than 1; implementing a first RAID level for the first production volume, wherein protection groups of the first RAID level have a number of back-end track members that aligns with the backend allocation unit; and implementing a second RAID level for the second production volume, wherein protection groups of the second RAID level have a number of back-end track members that does not align with the backend allocation unit, the compute nodes configured to respond to hosts accessing front-end tracks of the second production volume by grouping a plurality of accessed back-end tracks and accessing the back-end tracks of the group using a single IO.

In accordance with some implementations an apparatus comprises: a plurality of non-volatile drives; a plurality of interconnected compute nodes that access the drives using only one size of back-end allocation unit, the compute nodes configured to present first and second logical production volumes to hosts, wherein front-end tracks of the first and second production volumes correspond to back-end tracks of the non-volatile drives, and the backend allocation unit has a size that is an integer multiple of the back-end track size that is greater than 1, and wherein a first RAID level is implemented for the first production volume, wherein protection groups of the first RAID level have a number of back-end track members that aligns with the backend allocation unit, and a second RAID level is implemented for the second production volume, wherein protection groups of the second RAID level have a number of back-end track members that does not align with the backend allocation unit, the compute nodes configured, responsive to hosts accessing front-end tracks of the second production volume, to group a plurality of accessed back-end tracks and access the back-end tracks of the group using a single IO.

In accordance with some implementations a computer-readable storage medium stores instructions that when executed by a compute node of a storage array cause the compute node to perform a method for accessing non-volatile drives using only one size of back-end allocation unit while supporting multiple RAID levels, the method comprising: presenting first and second logical production volumes to hosts, wherein front-end tracks of the first and second production volumes correspond to back-end tracks of the non-volatile drives, and the backend allocation unit has a size that is an integer multiple of the back-end track size that is greater than 1; implementing a first RAID level for the first production volume, wherein protection groups of the first RAID level have a number of back-end track members that aligns with the backend allocation unit; and implementing a second RAID level for the second production volume, wherein protection groups of the second RAID level have a number of back-end track members that does not align with the backend allocation unit, the compute nodes configured to respond to hosts accessing front-end tracks of the second production volume by grouping a plurality of accessed back-end tracks and accessing the back-end tracks of the group using a single IO.

DETAILED DESCRIPTION

The terminology used in this disclosure is intended to be interpreted broadly within the limits of subject matter eligibility. The terms "drive" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multipurpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
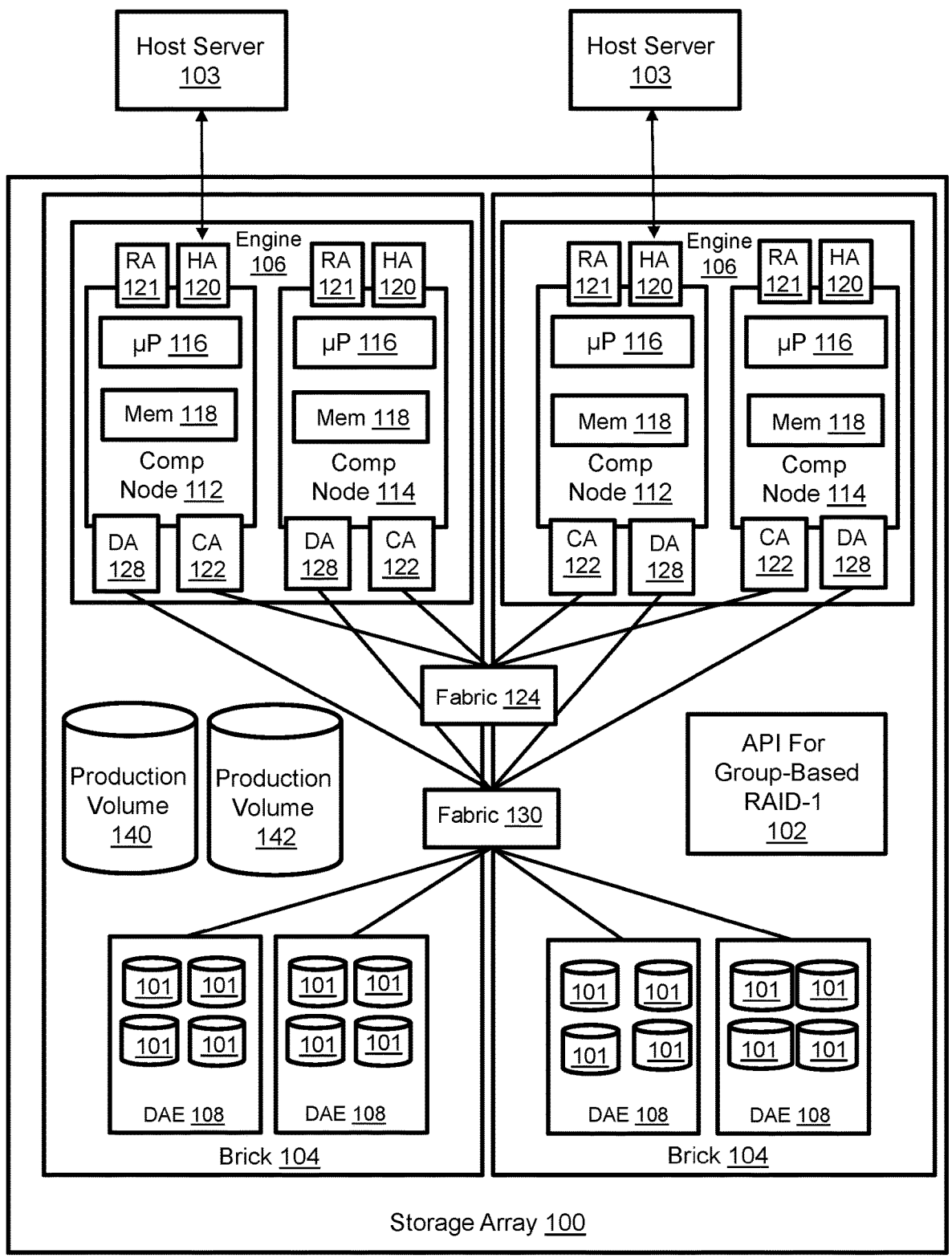
FIG. 1 illustrates a storage array with an API for resolving misalignment between a supported RAID level and back-end allocation unit size.

FIG. 1 illustrates a storage array 100 with an API 102 that helps to resolve misalignment between a supported RAID level and back-end allocation unit size. The storage array supports multiple RAID levels, e.g., RAID-1, RAID-5 (4+1), RAID-5 (8+1), and RAID-6, and uses only one size of back-end allocation unit, e.g., equivalent in size to n BE TRKs where n>1 and where n may be an integer multiple of the number of data members in a protection group, e.g., 4.

The storage array 100 is depicted in a simplified data center environment supporting two host servers 103 that run host applications. However, there would typically be more than two host servers. The host servers 103 may be implemented as individual physical computing devices, virtual machines running on the same hardware platform under control of a hypervisor, or in containers on the same hardware platform. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The HA resources may include processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 are non-volatile electronic data storage media such as, without limitation, solid-state drives (SSDs) based on electrically erasable programmable read-only memory (EEPROM) technology such as NAND and NOR flash memory and hard drive drives (HDDs) with spinning drive magnetic storage media. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Data associated with instances of a host application running on the hosts 103 is maintained on the managed drives 101. The managed drives 101 are not discoverable by the hosts 103 but the compute nodes create storage objects that can be discovered and accessed by the hosts. The storage objects that can be discovered by the hosts are sometimes referred to as production volumes 140, 142, and may alternatively be referred to as source devices, production devices, or production LUNs, where the logical unit number (LUN) is a number used to identify logical storage volumes in accordance with the small computer system interface (SCSI) protocol. From the perspective of the hosts 103, each production volume is a single drive having a set of contiguous LBAs at which FE TRKs of data used by the instances of the host application reside. However, the host application data is stored at non-contiguous addresses, possibly on multiple managed drives 101, e.g., at ranges of addresses distributed on multiple drives or multiple ranges of addresses on one drive. The compute nodes maintain metadata that maps between the production volumes and the managed drives 101 in order to process IO commands from the hosts using IO commands from the compute nodes to the managed drives.

As mentioned above, the storage array supports multiple RAID levels. In the illustrated example, RAID-5 (4+1) is implemented for production volume 140 and RAID-1 is implemented for production volume 142. RAID-5 is characterized by striping with distributed parity using multiple protection group members. RAID-1 is characterized by mirroring without striping or parity, so each protection group includes only one member. The number of data members in a protection group may be referred to as a slice. For purposes of explanation the single back-end allocation unit size used by the compute nodes to access the managed drives is selected based on slice size for supported RAID levels and may be equivalent to four BE TRKs, where each BE TRK has the same size as a fixed block architecture (FBA) FE TRK. All BE TRKs in the storage array have the same fixed size, which may be an integer (greater than 1) multiple of the managed drive sector size.

Figure 2:
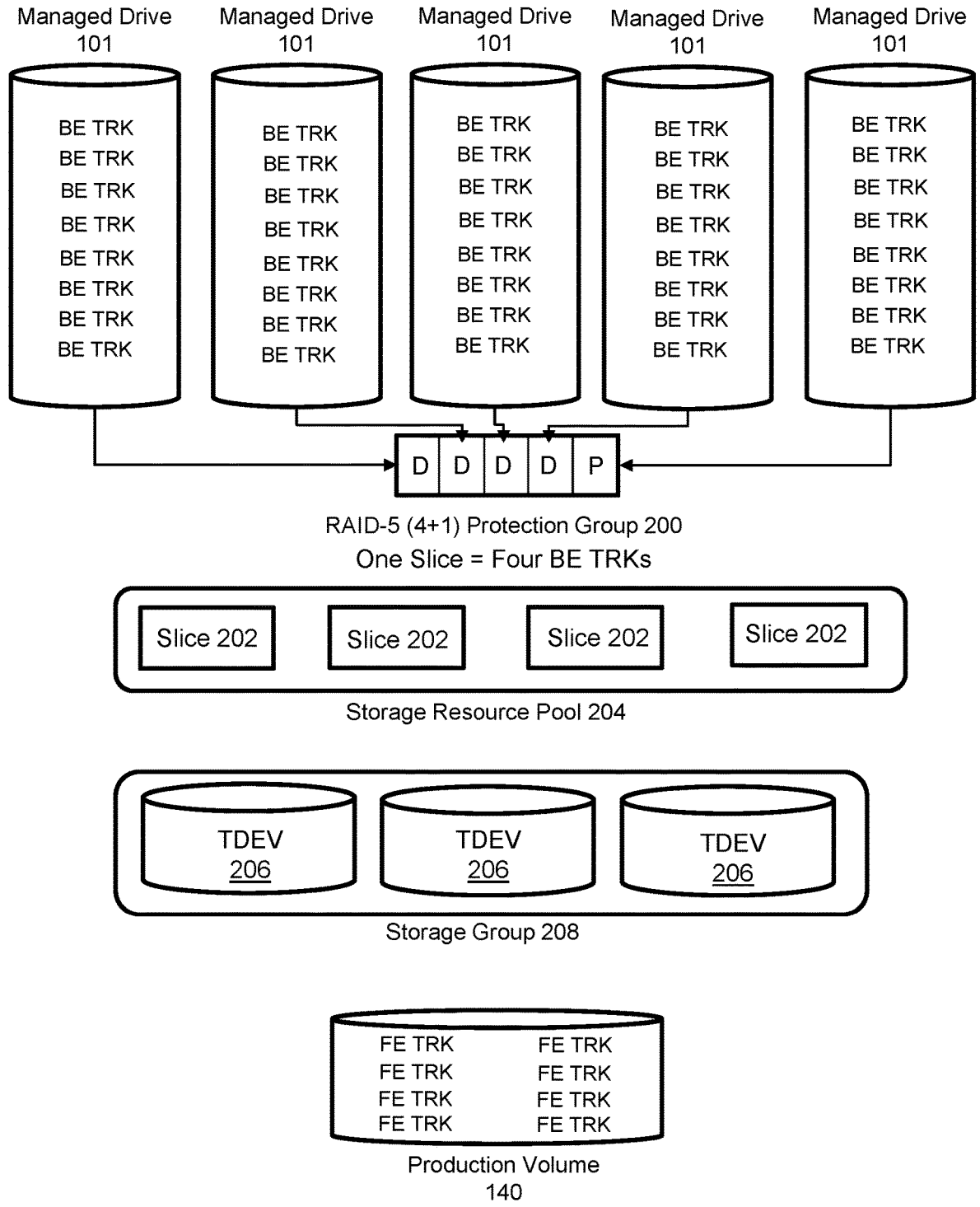
FIG. 2 illustrates layers of abstraction between the managed drives and the production volumes of the storage array of FIG. 1 with a RAID-5 (4+1) implementation that aligns with a back-end allocation unit size equivalent to four BE TRKs.

FIG. 2 illustrates layers of abstraction between the managed drives 101 and production volume 140. Five BE TRKs from different managed drives are used to create a RAID-5 (4+1) protection group 200, including four data members D and one parity member P. In order to be RAID-compliant, each member of the protection group must be on a different managed drive. The slice size for RAID-5 (4+1) is four because there are four data members, which aligns with the back-end allocation unit size of four BE TRKs, e.g., a four-BE TRK slice can be accessed with a single IO. RAID-5 (8+1) and RAID-6 also have numbers of data members that are integer multiples of four. RAID-5 protection group slices 202 are organized into a storage resource pool 204, which is a collection of RAID protection group slices of the same protection type, e.g., RAID-5 (4+1). Logical thin devices (TDEVs) 206 are created from the storage resource pool 204 and organized into a storage group 208. The production volume 140 is created from one or more storage groups. Because each RAID-5 (4+1) slice can be accessed with a single IO between the compute nodes and the managed drives, back-end IOs are efficiently processed.

Figure 3:
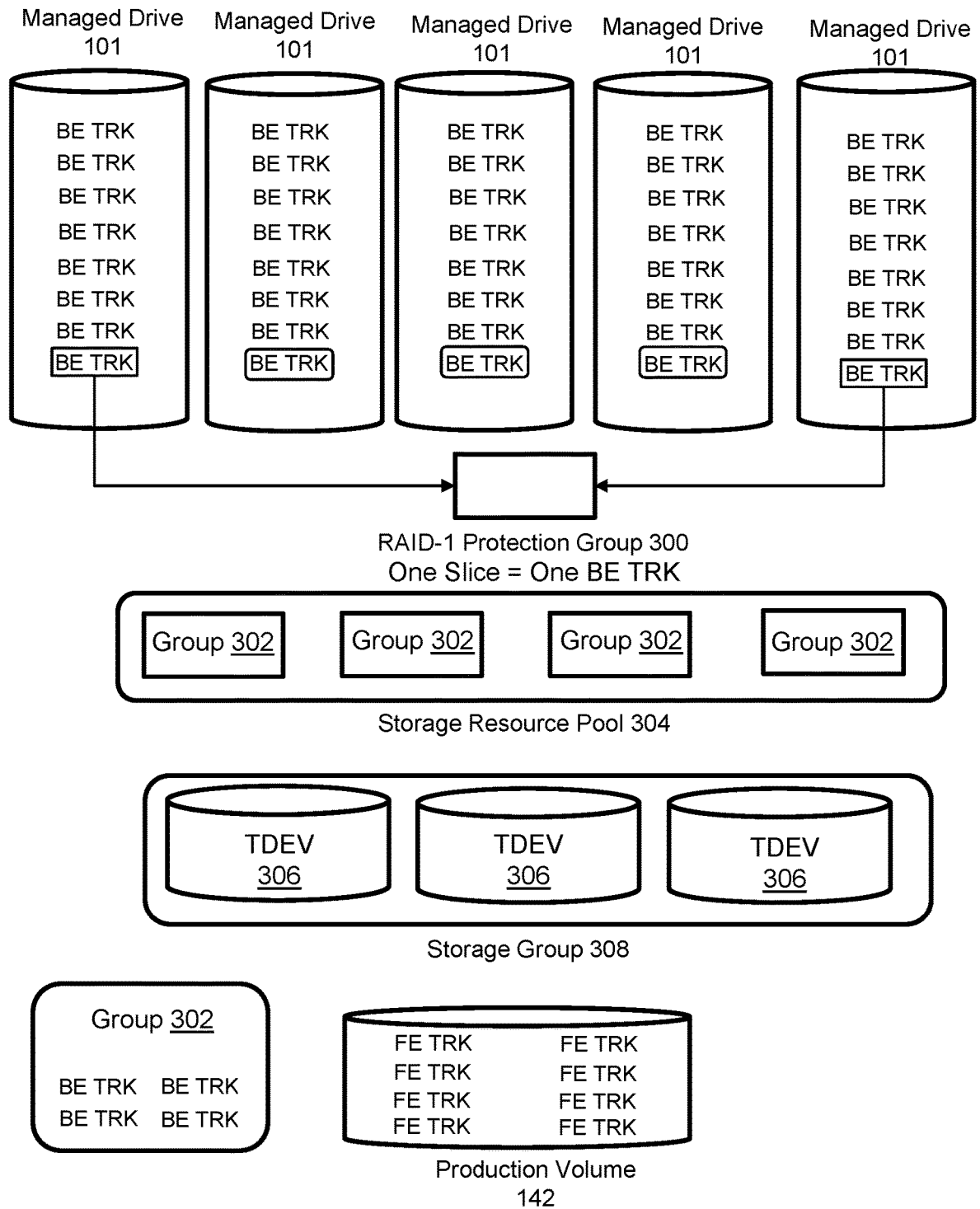
FIG. 3 illustrates layers of abstraction between the managed drives and the production volumes of the storage array of FIG. 1 with a RAID-1 implementation that does not align with the back-end allocation unit size equivalent to four BE TRKs.

FIG. 3 illustrates layers of abstraction between the managed drives 101 and production volume 142. BE TRKs from two different managed drives are used to mirror a RAID-1 data member. In order to be RAID-compliant, each copy must be on a different managed drive. RAID-1 includes only a single data member per protection group 300, corresponding to a slice size of one BE TRK. That slice size does not align with the back-end allocation unit size because four BE TRKs would be locked and copied or destaged between the managed drives and cache to access a single BE TRK that is associated with an IO from a host server.

In order to realize improved efficiency with RAID-1, the API for group-based RAID-1 102 (FIG. 1) dynamically creates BE TRK groups 302 that align with the back-end allocation unit size. In the illustrated example each group includes four BE TRKs, which aligns with the back-end allocation unit size of four BE TRKs. The group is a virtual four BE TRK slice that differs from the slice size corresponding to the RAID level of the grouped BE TRKs. Groups may be dynamically created such that the BE TRKs in the group are needed to process pending IOs. For example, four BE TRKs of different RAID-1 protection groups associated with four different pending host IOs may be included in a single group and accessed together with a single back-end IO, e.g., locked, and copied or destaged between the compute nodes and the managed drives. Groups 302 may be organized into a storage resource pool 304, which is a collection of groups of the same protection type, e.g., RAID-1. Logical thin devices (TDEVs) 306 are created from the storage resource pool and organized into a storage group 308. The production volume 142 is created from one or more storage groups. Because the group size aligns with the back-end allocation unit size of four BE TRKs, the compute nodes efficiently access the managed drives.

Figure 4:
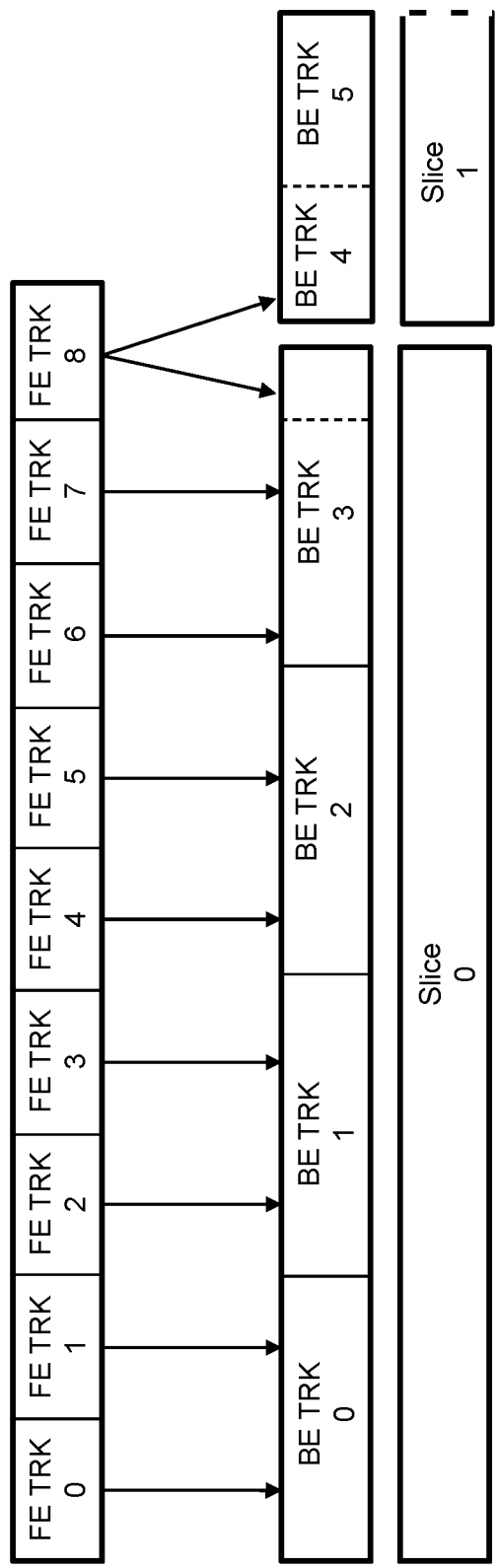
FIG. 4 illustrates packing of variable size FE TRKs.

FIG. 4 illustrates packing of variable size FE TRKs. Some FE TRKs may be stored as compressed data, so they are not full-size in the compressed form and require less than a full BE TRK. However, even uncompressed FE TRKs do not necessarily have a single fixed size and may require less than a full BE TRK. On a production volume with a variable-block architecture the uncompressed FE TRKs exist in a variety of sizes. For example, a count key data (CKD) track includes data blocks that can vary in length, up to a limit. Variable size FE TRKs can create wasted space when one BE TRK is used to store one smaller FE TRK. Non-full-size FE TRKs such as compressed FE TRKs and variable size FE TRKs can be packed into groups to improve utilization efficiency of storage resources. In the illustrated example, a group of eight full and one partial FE TRKs are packed into BE TRKs. As shown in the illustrated example, packing can result in the data of one FE TRK being distributed among two BE TRKs that are in different slices.

Figure 5:
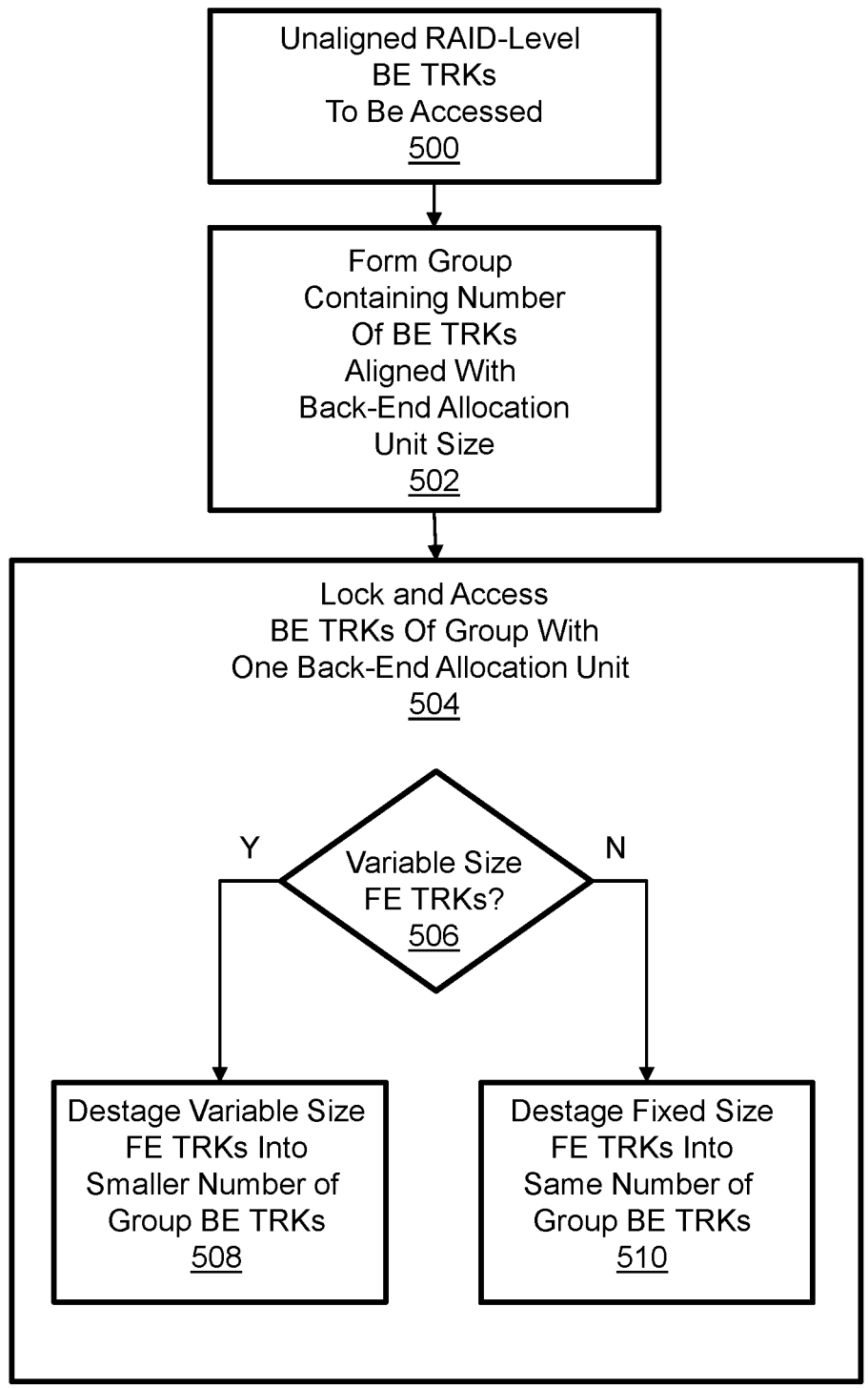
FIG. 5 illustrates a method for resolving misalignment between supported RAID levels and back-end allocation unit size.

FIG. 5 illustrates a method for resolving misalignment between supported RAID levels and back-end allocation unit size. Starting with a set of BE TRKs associated with pending IOs where the RAID level is misaligned with the back-end allocation unit size 500, groups of BE TRKs are formed as indicated in step 502. Each group includes a number of BE TRKs that most closely aligns with the back-end allocation unit size, e.g., with an aggregate size that is as close as possible to, but does not exceed, the back-end allocation unit size. After forming a group, the BE TRKs of the group are locked and accessed with a single back-end allocation unit as indicated in step 504. In the case of a read operation the data is copied to cache and used to service the IO from the host. In the case of a write operation, if the FE TRKs are variable size as determined in step 506 then the variable size FE TRKs are destaged into a smaller number of BE TRKs of the group as indicated in step 508. If the FE TRKs are FBA tracks, then the FE TRKs are destaged to the same number of BE TRKs of the group as indicated in step 510.

Although no specific advantages are necessarily associated with the inventive concepts at least some implementations enable use of back-end allocation units sized greater than a single BE TRK with fewer wasted resources than would be realized without groups. Consequently, it is practical to support multiple RAID levels using a single back-end allocation unit size that is greater in size than a single BE TRK. Further, compressed data and variable size FE TRKs can be efficiently accommodated.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented in a data storage system with a plurality of non-volatile drives and a plurality of interconnected compute nodes that access the drives using only one size of back-end allocation unit, the method comprising:
the compute nodes presenting first and second logical production volumes to hosts, wherein front-end tracks of the first and second production volumes correspond to back-end tracks of the non-volatile drives, and the backend allocation unit has a size that is an integer multiple of the back-end track size that is greater than 1;
implementing a first RAID level for the first production volume, wherein protection groups of the first RAID level have a number of back-end track members that aligns with the backend allocation unit; and
implementing a second RAID level for the second production volume, wherein protection groups of the second RAID level have a number of back-end track members that does not align with the backend allocation unit, the compute nodes configured to respond to hosts accessing front-end tracks of the second production volume by grouping a plurality of accessed back-end tracks and accessing the back-end tracks of the group using a single IO.

2. The method of claim 1 wherein implementing the first RAID level for the first production volume comprises implementing RAID-1 for the first production volume.

3. The method of claim 2 wherein grouping a plurality of accessed back-end tracks comprises grouping four accessed back-end tracks.

4. The method of claim 3 wherein accessing the back-end tracks of the group using a single IO comprises copying the grouped back-end tracks from the non-volatile drives to cache.

5. The method of claim 3 wherein accessing the back-end tracks of the group using a single IO comprises destaging the grouped back-end tracks from cache to the non-volatile drives.

6. The method of claim 3 comprising destaging a larger number of variable size front-end tracks into a smaller number of grouped back-end tracks.

7. The method of claim 3 comprising destaging a number of fixed size front-end tracks into an equal number of grouped back-end tracks.

8. A non-transitory computer-readable storage medium storing instructions that when executed by a compute node of a storage array cause the compute node to perform a method for accessing non-volatile drives using only one size of back-end allocation unit while supporting multiple RAID levels, the method comprising:
presenting first and second logical production volumes to hosts, wherein front-end tracks of the first and second production volumes correspond to back-end tracks of the non-volatile drives, and the backend allocation unit has a size that is an integer multiple of the back-end track size that is greater than 1;
implementing a first RAID level for the first production volume, wherein protection groups of the first RAID level have a number of back-end track members that aligns with the backend allocation unit; and
implementing a second RAID level for the second production volume, wherein protection groups of the second RAID level have a number of back-end track members that does not align with the backend allocation unit, the compute nodes configured to respond to hosts accessing front-end tracks of the second production volume by grouping a plurality of accessed back-end tracks and accessing the back-end tracks of the group using a single IO.

9. The non-transitory computer-readable storage medium of claim 8 wherein the method further comprises implementing the first RAID level for the first production volume comprises implementing RAID-1 for the first production volume.

10. The non-transitory computer-readable storage medium of claim 9 wherein the method further comprises grouping a plurality of accessed back-end tracks comprises grouping four accessed back-end tracks.

11. The non-transitory computer-readable storage medium of claim 10 wherein the method further comprises copying the grouped back-end tracks from the non-volatile drives to cache.

12. The non-transitory computer-readable storage medium of claim 10 wherein the method further comprises destaging the grouped back-end tracks from cache to the non-volatile drives.

13. The non-transitory computer-readable storage medium of claim 10 wherein the method further comprises destaging a larger number of variable size front-end tracks into a smaller number of grouped back-end tracks.

14. The non-transitory computer-readable storage medium of claim 10 wherein the method further comprises destaging a number of fixed size front-end tracks into an equal number of grouped back-end tracks.

15. An apparatus comprising:
a plurality of non-volatile drives;
a plurality of interconnected compute nodes that access the drives using only one size of back-end allocation unit, the compute nodes configured to present first and second logical production volumes to hosts, wherein front-end tracks of the first and second production volumes correspond to back-end tracks of the non-volatile drives, and the backend allocation unit has a size that is an integer multiple of the back-end track size that is greater than 1, and wherein a first RAID level is implemented for the first production volume, wherein protection groups of the first RAID level have a number of back-end track members that aligns with the backend allocation unit, and a second RAID level is implemented for the second production volume, wherein protection groups of the second RAID level have a number of back-end track members that does not align with the backend allocation unit, the compute nodes configured, responsive to hosts accessing front-end tracks of the second production volume, to group a plurality of accessed back-end tracks and access the back-end tracks of the group using a single IO.

16. The apparatus of claim 15 wherein the first RAID level is RAID-1.

17. The apparatus of claim 16 wherein each group contains four accessed back-end tracks.

18. The apparatus of claim 17 wherein the compute nodes copy grouped back-end tracks from the non-volatile drives to cache with a single IO.

19. The apparatus of claim 17 wherein the compute nodes destage grouped back-end tracks from cache to the non-volatile drives with a single IO.

20. The apparatus of claim 17 wherein the compute nodes destage a larger number of variable size front-end tracks into a smaller number of grouped back-end tracks.

\* \* \* \* \*